(12) United States Patent
Clark et al.

(10) Patent No.: US 12,000,537 B2
(45) Date of Patent: Jun. 4, 2024

(54) METHOD OF CLADDING A PRESSURE VESSEL

(71) Applicant: ROLLS-ROYCE SMR LIMITED, Derby (GB)

(72) Inventors: Daniel Clark, Derby (GB); Sebastiano D Giudice, Market Harborough (GB); Carl Boettcher, Derby (GB)

(73) Assignee: ROLLS-ROYCE SMR LIMITED, Derby (GB)

( * ) Notice: Subject to any disclaimer, the term of this patent is extended or adjusted under 35 U.S.C. 154(b) by 1128 days.

(21) Appl. No.: 16/644,293

(22) PCT Filed: Aug. 20, 2018

(86) PCT No.: PCT/EP2018/072454
§ 371 (c)(1),
(2) Date: Mar. 4, 2020

(87) PCT Pub. No.: WO2019/052780
PCT Pub. Date: Mar. 21, 2019

(65) Prior Publication Data
US 2021/0062971 A1   Mar. 4, 2021

(30) Foreign Application Priority Data
Sep. 15, 2017   (GB) .................................. 1714864

(51) Int. Cl.
*F17C 1/10* (2006.01)
*B23K 26/21* (2014.01)
(Continued)

(52) U.S. Cl.
CPC ................ *F17C 1/10* (2013.01); *B23K 26/21* (2015.10); *C21D 9/08* (2013.01); *C22F 1/10* (2013.01);
(Continued)

(58) Field of Classification Search
CPC ................ F17C 1/10; F17C 2201/0109; F17C 2203/0604; F17C 2203/0643;
(Continued)

(56) References Cited

U.S. PATENT DOCUMENTS 9,126,130 B2   9/2015   Killian et al.
2008/0190938 A1   8/2008   Johannsson et al.
(Continued)

FOREIGN PATENT DOCUMENTS

JP   S60-155098 A   8/1985
JP   2006-062324 A   3/2006
(Continued)

OTHER PUBLICATIONS

Feb. 8, 2022 Office Action issued in Chinese Patent Application No. 201880074224.3.
(Continued)

*Primary Examiner* — Rick K Chang
(74) *Attorney, Agent, or Firm* — Oliff PLC (57) ABSTRACT

Cladding of the interior of a component part of a pressure vessel is shown. A lining which conforms to at least a portion of the interior geometry of the component is positioned in the interior of the component. The lining is then pressed into the component past its yield strength. The lining is then fused to the component.

9 Claims, 14 Drawing Sheets

(51) Int. Cl.
  *B23K 101/12*   (2006.01)
  *B23K 103/04*   (2006.01)
  *B23K 103/08*   (2006.01)
  *C21D 9/08*    (2006.01)
  *C22F 1/10*    (2006.01)

(52) U.S. Cl.
  CPC ...... *B23K 2101/12* (2018.08); *B23K 2103/05* (2018.08); *B23K 2103/08* (2018.08); *F17C 2201/0109* (2013.01); *F17C 2203/0604* (2013.01); *F17C 2203/0643* (2013.01); *F17C 2203/0648* (2013.01); *F17C 2209/221* (2013.01); *F17C 2209/224* (2013.01); *F17C 2209/232* (2013.01); *F17C 2209/236* (2013.01)

(58) Field of Classification Search
  CPC ........ F17C 2203/0648; F17C 2209/221; F17C 2209/224; F17C 2209/232; F17C 2209/236; F17C 2203/0639; F17C 2209/22; F17C 2209/234; F17C 2270/05; F17C 2270/0581; B23K 26/21; B23K 2101/12; B23K 2103/05; B23K 2103/08; C21D 9/08; C22F 1/10; Y02E 30/30
  See application file for complete search history.

(56) References Cited

U.S. PATENT DOCUMENTS

| | | | |
|---|---|---|---|
| 2012/0032404 A1* | 2/2012 | Seib | B23K 26/34 228/164 |
| 2015/0308619 A1 | 10/2015 | Nettis et al. | |
| 2017/0106473 A1 | 4/2017 | Lawler et al. | |

FOREIGN PATENT DOCUMENTS

| | | |
|---|---|---|
| JP | 2007-330972 A | 12/2007 |
| KR | 2016-0142234 A | 12/2016 |

OTHER PUBLICATIONS

Nov. 26, 2018 Search Report issued in International Patent Application No. PCT/EP2018/072454.

Nov. 26, 2018 Written Opinion of the International Searching Authority issued in International Patent Application No. PCT/EP2018/072454.

Mar. 15, 2018 Search and Examination Report issued in British Patent Application No. GB1714864.4.

Nov. 25, 2022 Office Action issued in Japanese Patent Application No. 2020-515667.

* cited by examiner

METHOD OF CLADDING A PRESSURE VESSEL

TECHNICAL FIELD

This invention relates to cladding the interiors of component parts of pressure vessels.

BACKGROUND

Pressure vessels are used in a number of industrial applications, including in nuclear reactors, for containing gases or liquids at pressures over or under the ambient pressure. Very often the interior of the pressure vessel is lined with a corrosion-resistant layer, usually referred to as a cladding, to reduce the risk of, for example, stress corrosion cracking, pitting, and the formation of debris that could end up in suspension.

The cladding layer is typically fused to the parent material of the pressure vessel, typically a low-alloy steel, possibly using a suitable welding process. Thus, in practice, the cladding material, which may be stainless steel or a nickel-base alloy, is provided in the form of a wire, a strip, or a powder. This is then heated, which causes it to melt and fuse to the parent material of the pressure vessel. The limiting factor in terms of the speed at which the interior of a pressure vessel may be clad is thus the deposition rate of the cladding material into the weld pool during the welding process.

SUMMARY

The invention is directed towards methods and apparatuses for cladding the interior of a component part of a pressure vessel.

After obtaining the component, a lining for the component is obtained which conforms to at least a portion of the interior geometry. The lining is positioned against the interior of the component. The lining is then pressed into the component past the yield strength of the lining. The lining is then fused to the component.

A pressing device comprising one or more rollers may be used to press the lining into the component past the yield strength of the lining. A fusing device may be used to fuse the lining to the interior of the component.

BRIEF DESCRIPTION OF THE DRAWINGS

The invention will now be described by way of example only with reference to the accompanying drawings, which are purely schematic and not to scale, and in which.

DETAILED DESCRIPTION

Figure 1A:
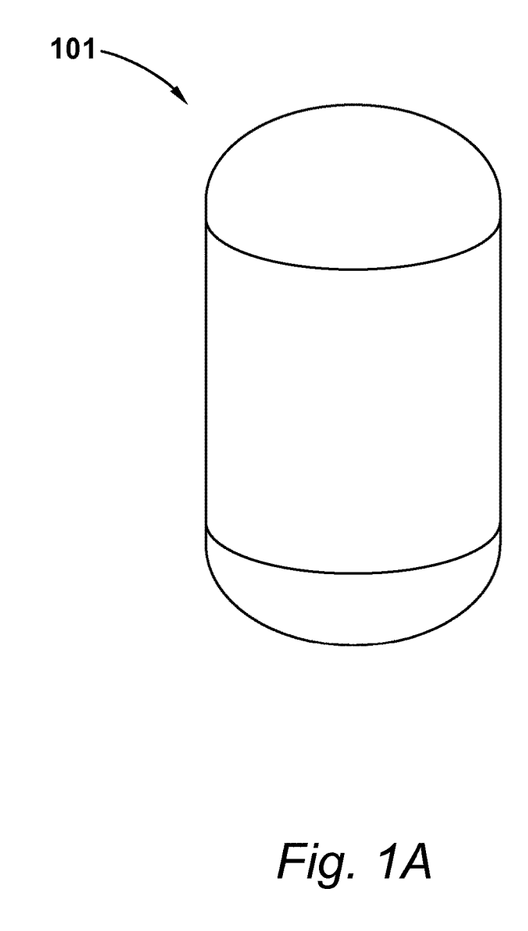
FIGS. 1A and 1B show a pressure vessel in perspective and exploded views respectively.
Figure 1B:
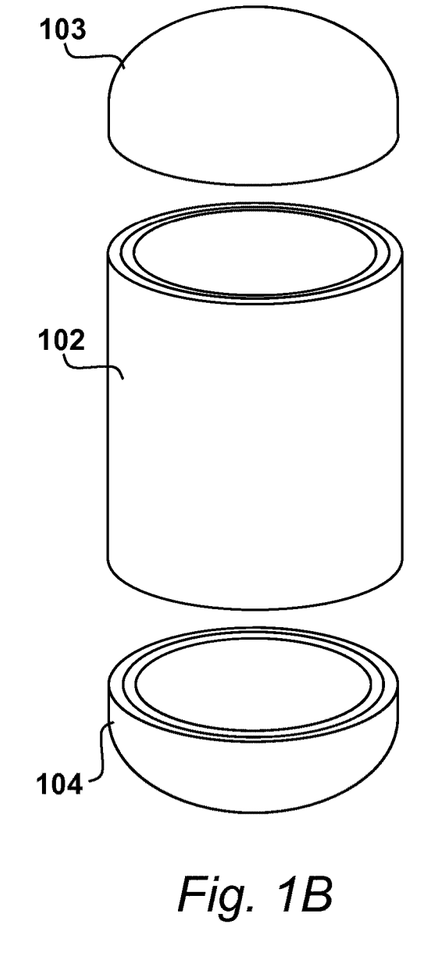

FIGS. 1A & 1B

A pressure vessel 101 is identified in FIG. 1A, with an exploded view showing the component parts being presented in FIG. 1B. For the sake of clarity, nozzles and other fixtures and fittings have been omitted.

In this example, the pressure vessel 101 comprises a cylindrical main body 102, along with torispherical (also known as dished) heads 103 and 104. It will be appreciated that methods and apparatuses according to the present invention may be applied to pressure vessels having alternative shapes, such as cylindrical vessels with hemispherical, ellipsoidal, or even flat heads, or indeed spherical vessels made up of two hemispherical halves.

Figure 2A:
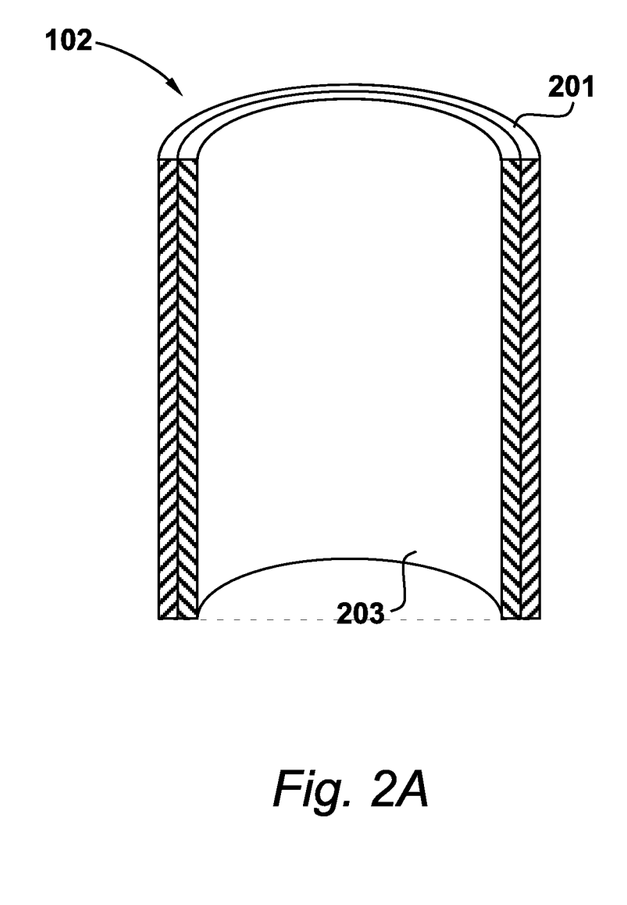
FIGS. 2A and 2B show cutaways of the main body and head of the pressure vessel of FIG. 1A.
Figure 2B:
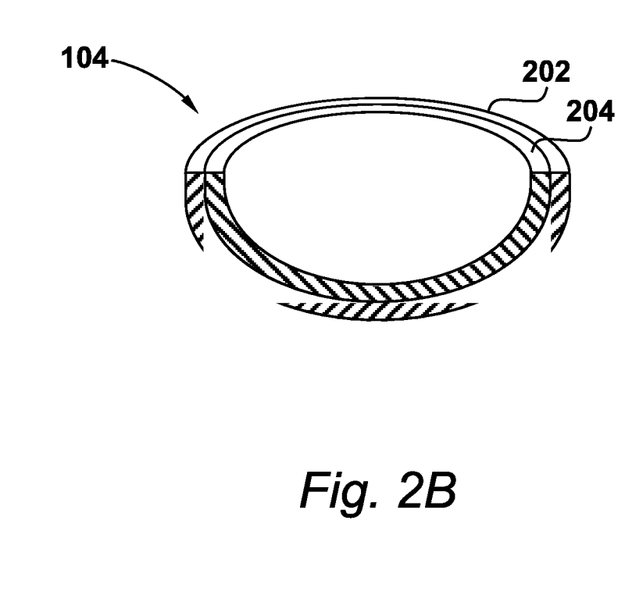

FIGS. 2A & 2B

A cutaway of the main body 102 of the pressure vessel 101 is shown in FIG. 2A, and a cutaway of the head 104 is shown in FIG. 2B.

Each of the main body 102 and head 104 (head 103 being identical in this example) comprise a low-alloy steel outer shell, identified as 201 and 202 respectively. In this example the shell material is A517 steel. Other materials may be used depending upon the intended use of the pressure vessel 101.

The main body 102 and the head 104 further comprise cladding, identified as 203 and 204 respectively. The cladding material in this example is 316L stainless steel. Again, it will be appreciated that other materials such as a nickel-base alloy may be used for the cladding in dependence upon the intended use and thus the required corrosion resistance for the pressure vessel 101.

As described previously, the cladding material is typically fused to the outer shell of the pressure vessel by a welding process. Given the large area to be clad, which for instance may be in excess of 250 square meters for a nuclear reactor pressure vessel, the process of cladding the interior of the pressure vessel may take a substantial amount of time, with process time in excess of 1000 hours not being unusual.

Figure 3:
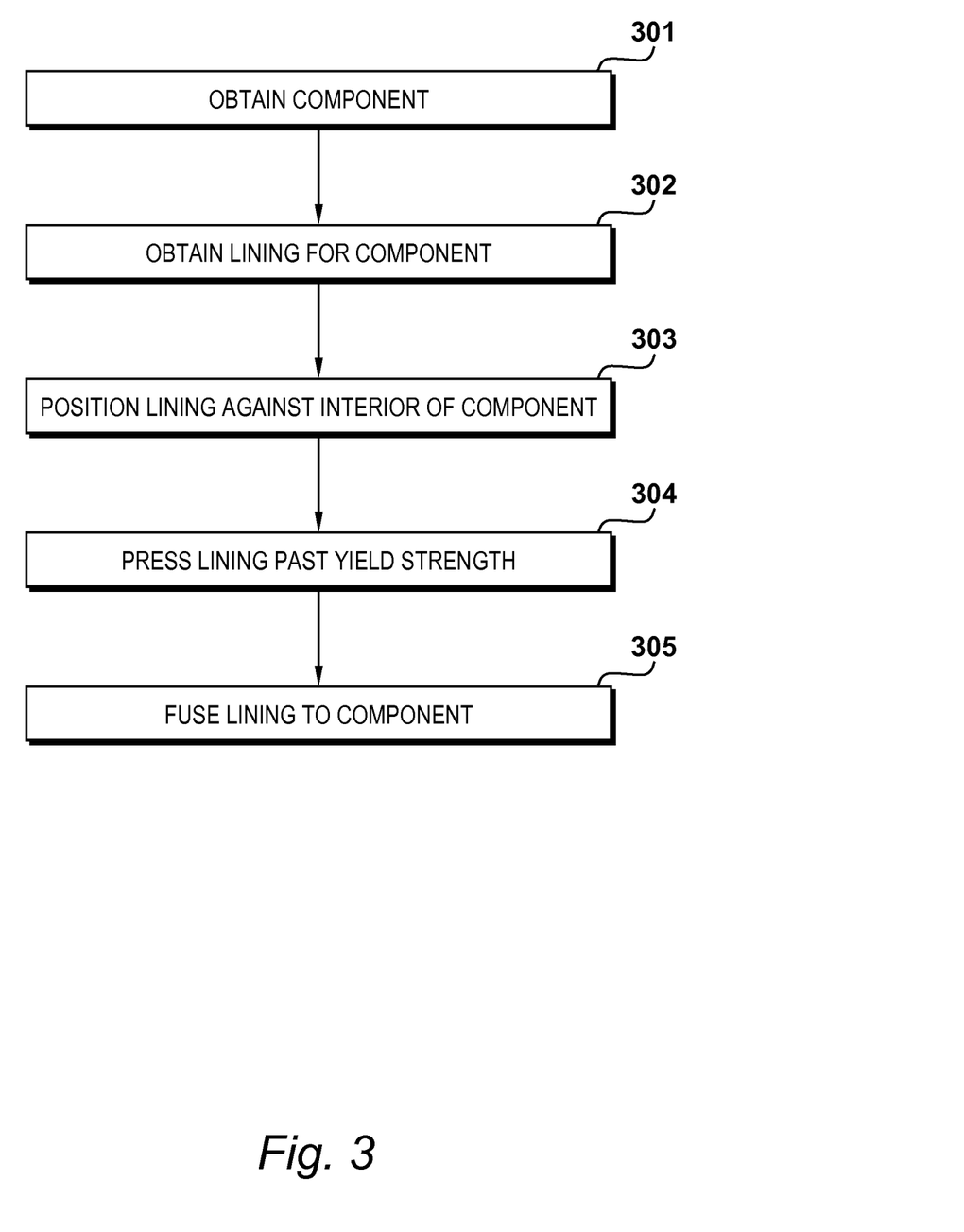
FIG. 3 shows a method according to an aspect of the present invention to clad the interior of a component part of the pressure vessel of FIG. 1.

FIG. 3

A method of cladding the interior of a component part of a pressure vessel according to the present invention is shown in FIG. 3. This method seeks to reduce the time taken to clad the interior of a pressure vessel.

At step 301, the component to be clad is obtained. At step 302, a lining is obtained for the component which conforms to at least a portion of the interior geometry of the component. Thus, in one example, the component is the outer shell 201 of the main body 102, and the lining is a cylindrical sleeve that conforms to the whole interior geometry of the component. Alternatively, the lining may be a cylindrical sleeve but which is not as high as the cylindrical main body. A plurality of such linings may therefore be obtained. In an example, should a component part of the pressure vessel 101 include nozzles or other apertures for gas or liquid, the lining may also be formed with corresponding apertures.

At step 303, the lining is positioned in the interior of the component, and at step 304 the lining is pressed into the component. Step 304 comprises subjecting the lining to a compressive force of a magnitude which results in it being pressed past its yield strength. In this way, the lining does not return to its original shape elastically, and remains pressed against the interior of the component. In a specific embodiment, step 304 comprises repeated iterations of pressing the lining and annealing the lining, until the lining exceeds its yield strength. In one embodiment the annealing may be performed at component level, or locally by a heat source proximal to a portion of the lining.

The pressing of the lining past its yield strength allows, at step 305, the lining to be fused to the component to clad it. In an embodiment, the fusing process comprises welding the lining to the component. In a specific embodiment, the fusing process comprises laser welding of the lining to the component.

In an alternative embodiment, it is possible for the welding process to be an arc welding process. In a further alternative embodiment, the welding process may be an electron beam welding process. It is also envisaged that other fusion techniques may be used, such as explosive forming or magnetically-impelled high strain rate forming.

In a specific embodiment, step 305 comprises a first weld stage in which the lining is tack-welded to the component. This is followed by a full weld stage in which the entirety of the lining is subjected to welding so as to achieve full fusion to the component.

The application of the method set out in FIG. 3 to the main body 102 will be described further with reference to FIGS. 4A to 11, and the application of the method set out in FIG. 3 to the heads 103 and 104 will be described further with reference to FIGS. 12 to 14B.

Figure 4A:
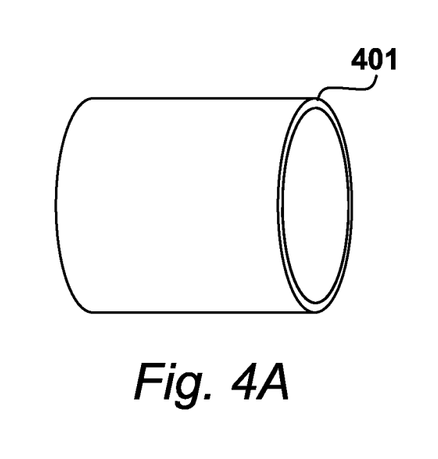
FIGS. 4A, 4B and 4C show a first lining for the outer shell of the main body of the pressure vessel of FIG. 1.
Figure 4B:
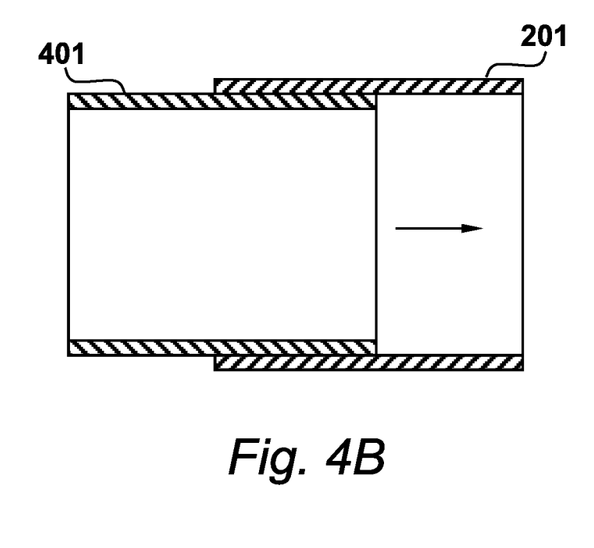
Figure 4C:
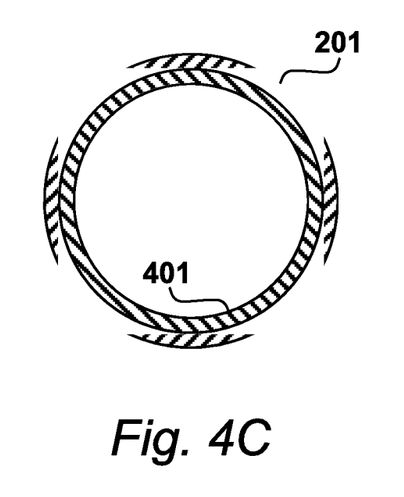

FIGS. 4A, 4B & 4C

A first lining 401 for forming the cladding 203 of the main body 102 of the pressure vessel 101 is shown in FIG. 4A. In this embodiment, the lining 401 is hollow and cylindrical, and has substantially the same outer diameter as the interior diameter of the outer shell 201, albeit slightly less so as to allow the lining 401 to be inserted into the main body 102. In this specific embodiment, the lining is a seamless tube. Thus, as shown in FIG. 4B, it may be slid into position. A cross-section of the main body 102 with the lining 401 in position inside the outer shell 201 is shown in FIG. 4C.

The first lining 401 may be suitable for a production environment in which all main bodies are the same dimension, and so the same specification lining may be used for all bodies being produced.

In an alternative embodiment, the lining 401 is thin so as to be more flexible. It may therefore be made smaller in diameter to aid handling, for example. Due to the increase in flexibility, the lining may still be pressed into the main body 102 past its yield strength.

Figure 5A:
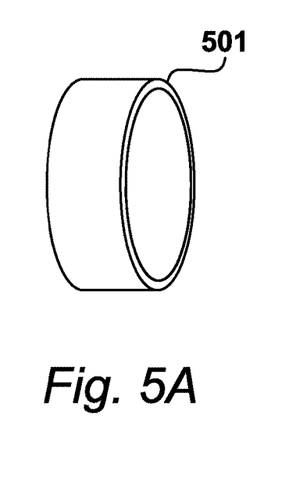
FIGS. 5A, 5B and 5C show a second lining.
Figure 5B:
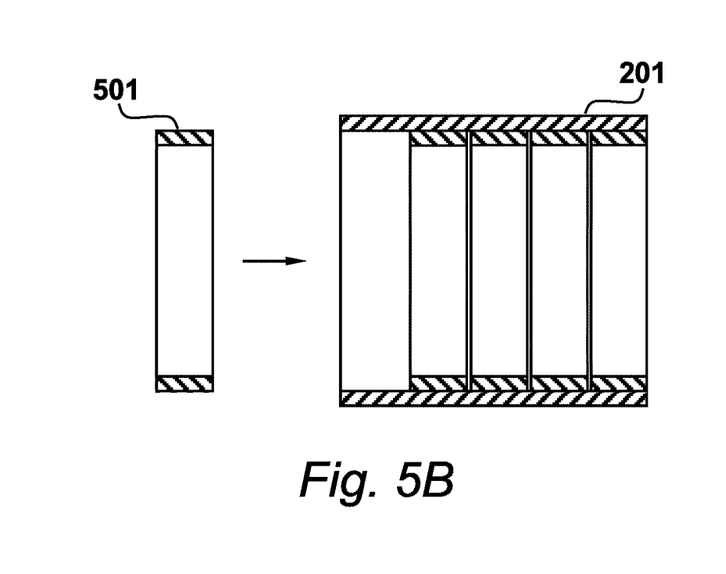
Figure 5C:
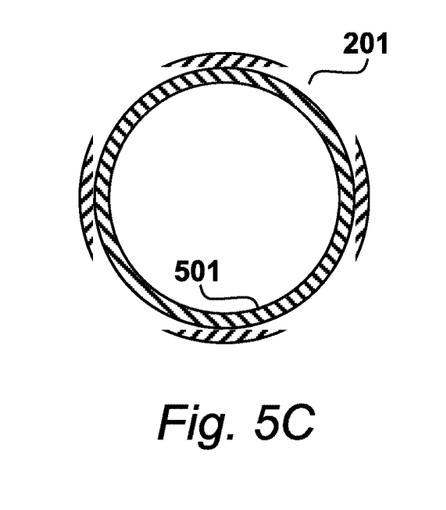

FIGS. 5A, 5B & 5C

A second lining 501 for forming the cladding 203 of the main body 102 of the pressure vessel 101 is shown in FIG. 5A. In this embodiment, the lining 401 is again hollow and cylindrical, and has substantially the same outer diameter as the diameter of the interior of the outer shell 201. However, its height is less than that of the outer shell 201. Thus, as shown in FIG. 5B, a plurality of linings 501 may be slid into the interior of outer shell 201. A cross-section of the main body 102 with the lining 501 in position inside the outer shell 201 is shown in FIG. 5C.

The second lining 501 may be suitable for a production environment in which pressure vessel main bodies are not the same dimension, and so stacks of different linings may be used to cover the total interior surface of the outer shells 201 of the main bodies. In practice, any gaps between the linings 501 will be filed during fusion to the outer shell 201.

Figure 6A:
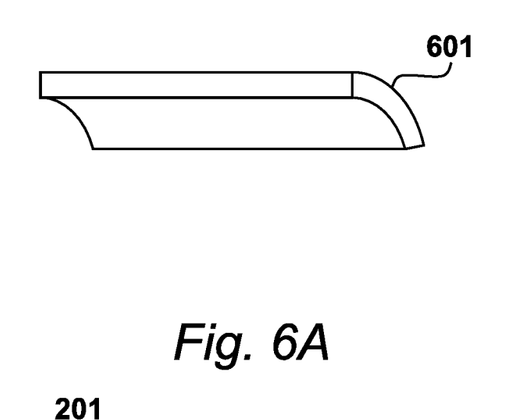
FIGS. 6A, 6B and 6C show a third lining.
Figure 6B:
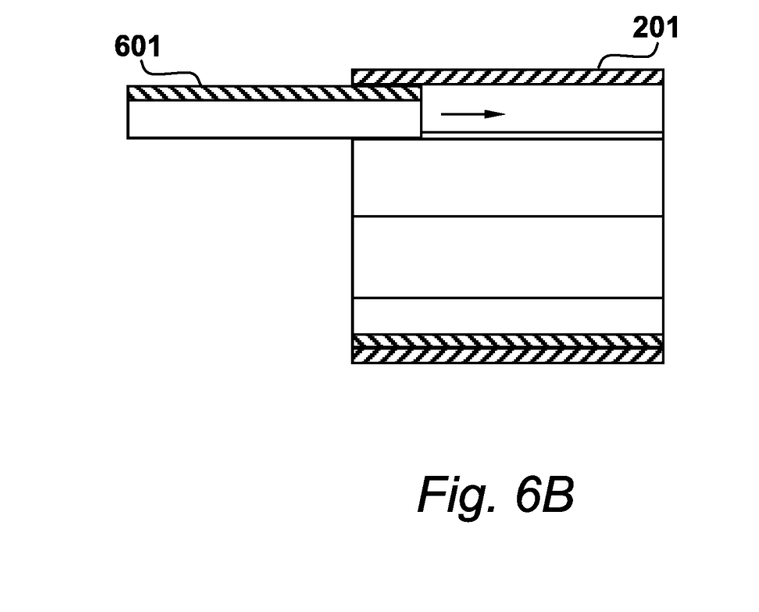
Figure 6C:
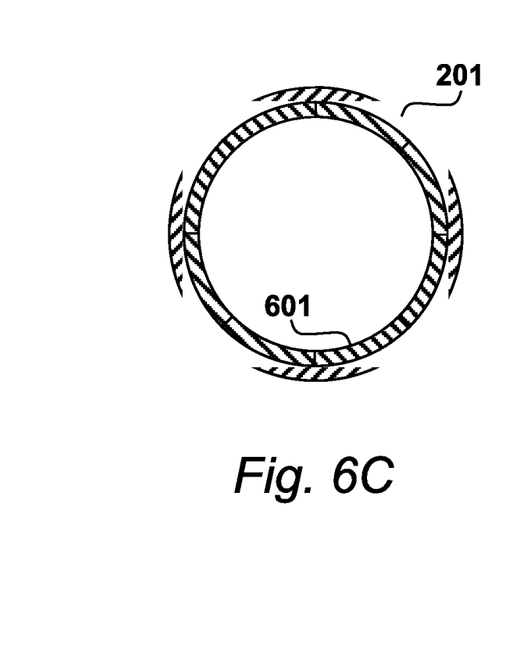

FIGS. 6A, 6B & 6C

A third lining 601 for forming the cladding 203 of the main body 102 of the pressure vessel 101 is shown in FIG. 6A. In this embodiment, the lining 601 is an arcuate extrusion, and has substantially the same outer curvature as the interior geometry of the outer shell 201. In the present example, it has the same height as the outer shell 201, but in alternative embodiments may have a different height. Thus, as shown in FIG. 6B, it may be slid into position along with a plurality of other linings 601 to cover the interior of the outer shell 201. A cross-section of the main body 102 with the lining 601 in position is shown in FIG. 6C.

Figure 7A:
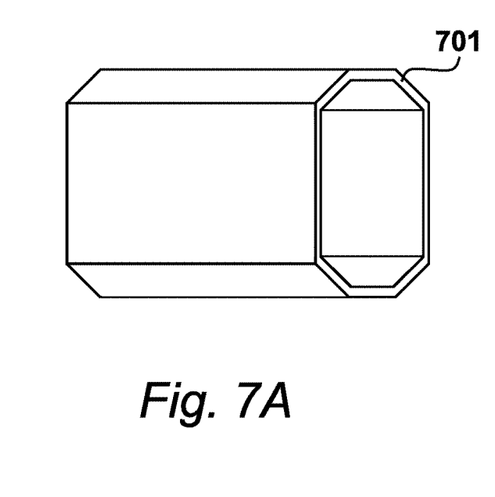
FIGS. 7A, 7B and 7C show a fourth lining.
Figures 7B, 7C:
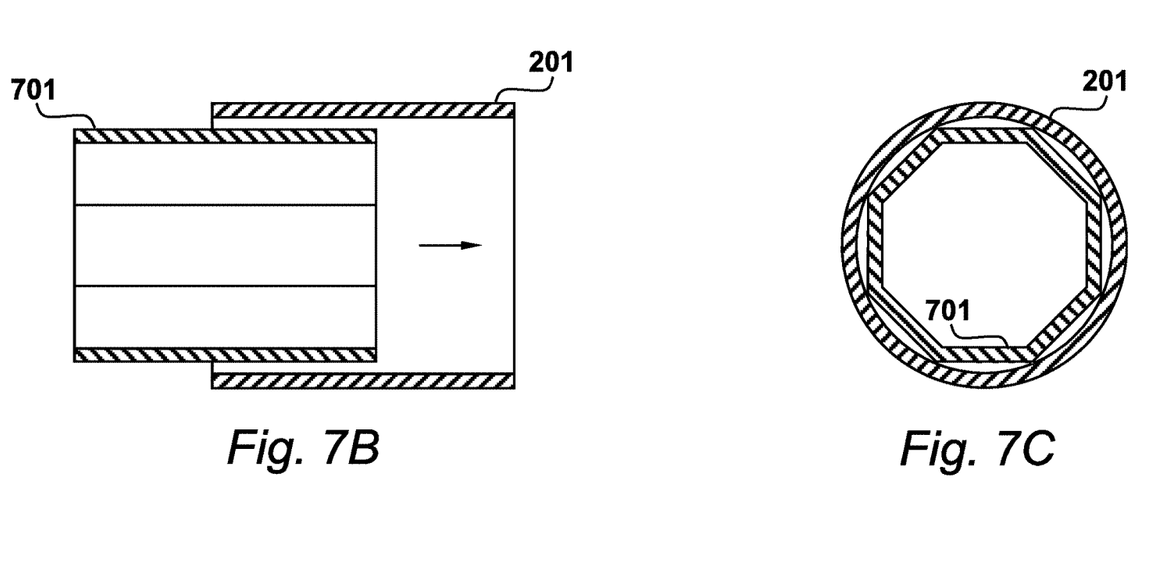

FIGS. 7A, 7B & 7C

A fourth lining 701 for forming the cladding 203 of the main body 102 of the pressure vessel 101 is shown in FIG. 7A. In this embodiment, the lining 701 is hollow and in the form of a prism. In this specific embodiment, the prism is an octagonal prism. The maximum diameter of the polygon that forms the prism (i.e. in this specific case the diameter of the octagon) is substantially the same as the interior diameter of the outer shell 201.

In the present example, the lining 701 it has the same height as the outer shell 201, but in alternative embodiments may have a different height with a plurality of linings 701 provided. As shown in FIG. 7B, the lining 701 may be slid into position to cover the interior of the outer shell 201. A cross-section of the main body 102 with the lining 701 in position inside the outer shell 201 is shown in FIG. 7C.

Figure 8A:
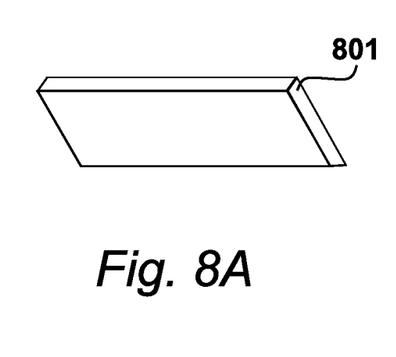
FIGS. 8A, 8B and 8C show a fifth lining.
Figure 8B:
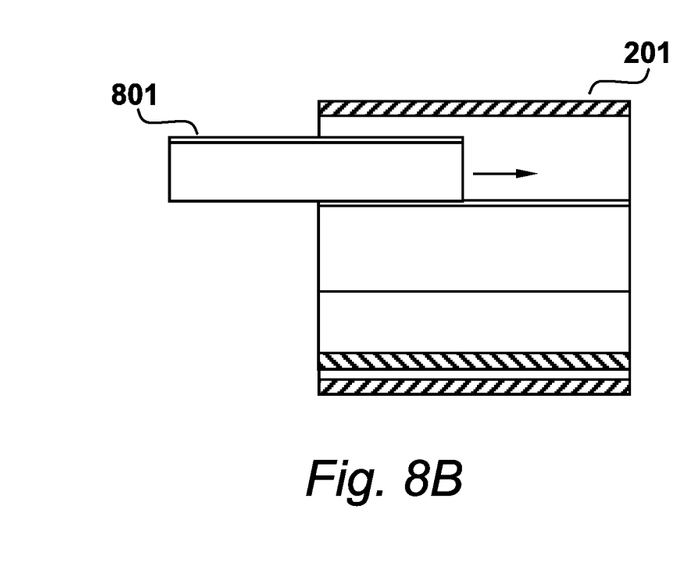
Figure 8C:
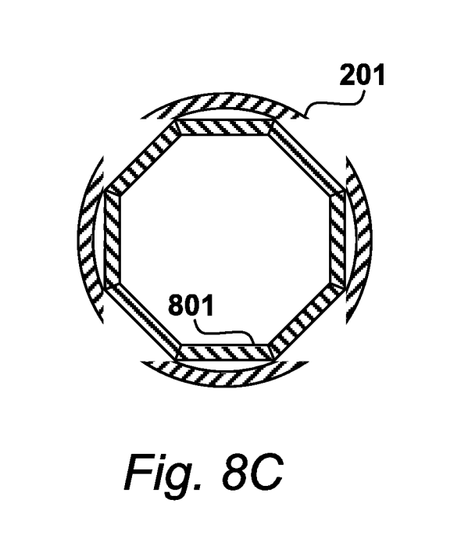

FIGS. 8A, 8B & 8C

A fifth lining 801 for forming the cladding 203 of the main body 102 of the pressure vessel 101 is shown in FIG. 8A. In this embodiment, the lining 801 is an extrusion of a trapezium. A plurality of linings 801 are provided in this embodiment to cover the interior of the outer shell 201, with them being slid into place as shown in FIG. 8B. The lining 801 effectively forms one edge of a polygon, which, due to the specific selection of the internal angles of the trapezium on which the lining 801 is based, and referring to FIG. 8C, is an octagon. Other polygons may be formed by adjustment of the angles in the trapezoidal base of the linings 801.

Figure 9A:
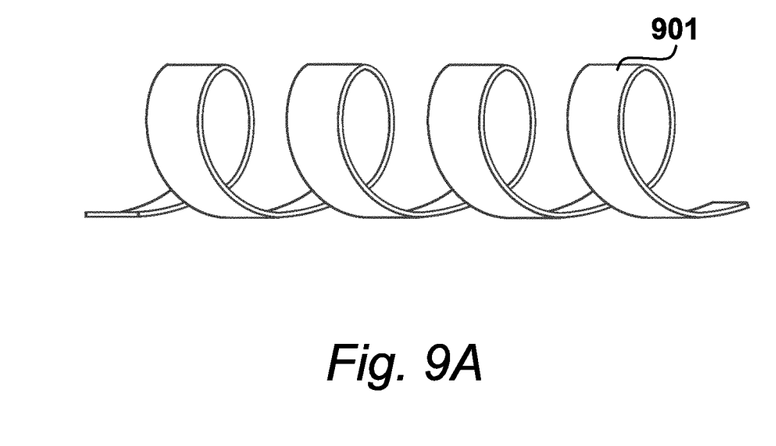
FIGS. 9A, 9B and 9C show a sixth lining.
Figure 9B:
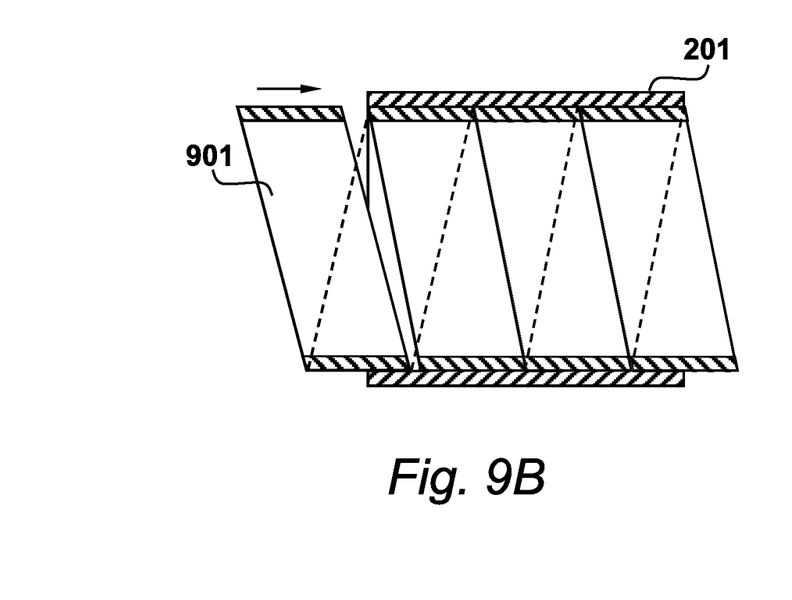
Figure 9C:
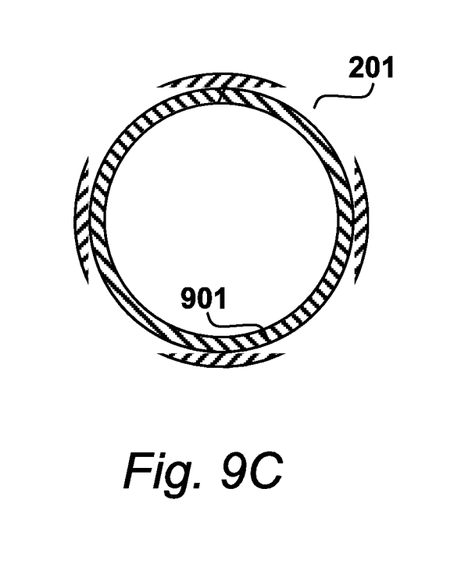

FIGS. 9A, 9B & 9C

A sixth lining 901 for forming the cladding 203 of the main body 102 of the pressure vessel 101 is shown in FIG. 9A. In this embodiment, the lining 901 is a helical strip. In practice this may be wound from a single strip of lining material. Referring to FIGS. 9B and 9C, the lining 901 may be wound inside the outer shell 201 to cover the interior thereof. A machining operation may then remove excess lining material.

Figure 10:
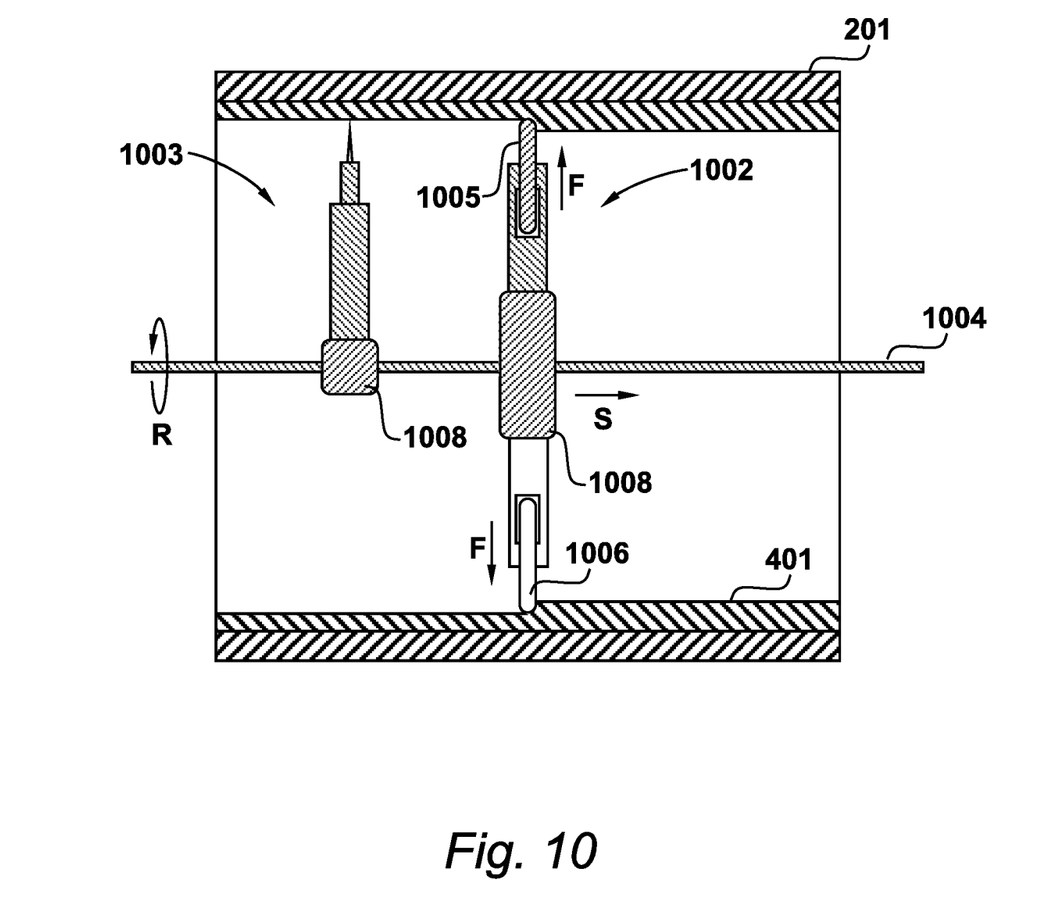
FIGS. 10 and 11 show an apparatus for pressing and fusing the lining to the outer shell of the main body of the pressure vessel of FIG. 1A.
Figure 11:
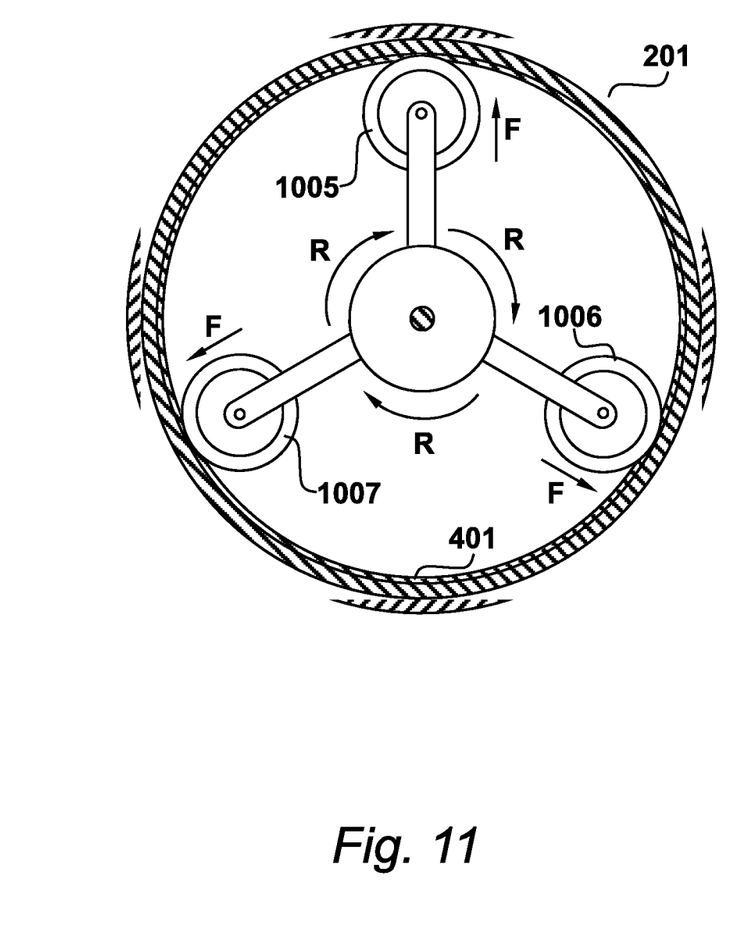

FIGS. 10 & 11

An apparatus 1001 for pressing the lining into place, in this example lining 401, and fusing the lining to the outer shell 201 is shown in a perpendicular cross section in FIG. 10, and in a parallel cross section in FIG. 11.

Once the lining 401 has been placed in the interior of the outer shell 201, the apparatus 1001 is inserted. The apparatus 1001 comprises a pressing system 1002 operative to press the lining 401 into the outer shell 201, and a fusing system 1003 operative to fuse the lining 401 to the outer shell 201. The pressing system 1002 and fusing system 1003 are both translatably mounted upon a rotatable shaft 1004 which is, in the present example, concentric with the outer shell 201.

In the present embodiment, the pressing system 1002 comprises three rollers 1005, 1006, and 1007 mounted in an equiangular fashion around a motorised advance system 1008. In an alternative embodiment, fewer rollers are provided, for example one or two. In another alternative embodiment, more rollers are provided, for example four. The advance system 1008 includes a drive mechanism (not shown) to propel the pressing system 1002 along the shaft 1004 in the direction of arrow S. The rollers 1005, 1006, and 1007 provide a radially outward force F which compresses the lining 401. In an embodiment, the rollers may be connected to the advance system 1008 by hydraulic pistons which may provide control over the degree of force F applied.

In an embodiment, the pressing system 1002 further comprises one or more heat sources (not shown) to heat the lining 401 to anneal it. In one mode of operation, pressing of the lining 401 may be followed by annealing. In another mode of operation, there may be repeated iterations of pressing an annealing. In other embodiments, other heat treatments may also be conducted on a single or iterative basis.

The fusing system 1003 comprises, in this embodiment, a welding system 1009 mounted on the advance system 1008. The welding system in this example is a laser welding system operative to weld the lining 401 to the outer shell 201. As described previously, other types of welding apparatus may be used. Further, other fusing techniques may be employed.

In other embodiments, the fusing system 1002 may comprise a plurality of welding systems mounted on the advance system 1008. The welding systems may be mounted equiangularly around the advance system 1008. Such an arrangement may assist in the reduction of temperature gradients and thus reduction of thermal expansion and contraction around the circumference of the lining 401.

In operation, the shaft 1004 is rotated in the direction of arrow R, whilst the pressing system 1002 and fusing system 1003 advance along it in the direction of arrow S. The application of the forces F by the pressing system 1002 presses the lining 401 into the outer shell 201 past its yield strength. The fusing system 1003 then fuses the lining 401 to the outer shell 201 to produce the clad main body 102 for the pressure vessel 101. In an example, the final thickness of the cladding 203 may be 6 millimetres. Other thicknesses may be selected, however, depending upon the intended use of the pressure vessel 101.

In an alternative embodiment, the shaft may be fixed with the main body rotated instead. In another embodiment, the pressing system 1002 and fusing system 1002 are not mounted on the same shaft and instead pressing of the entirety of the lining 401 is performed, followed by fusing of the entirety of the lining 401.

Figure 12A:
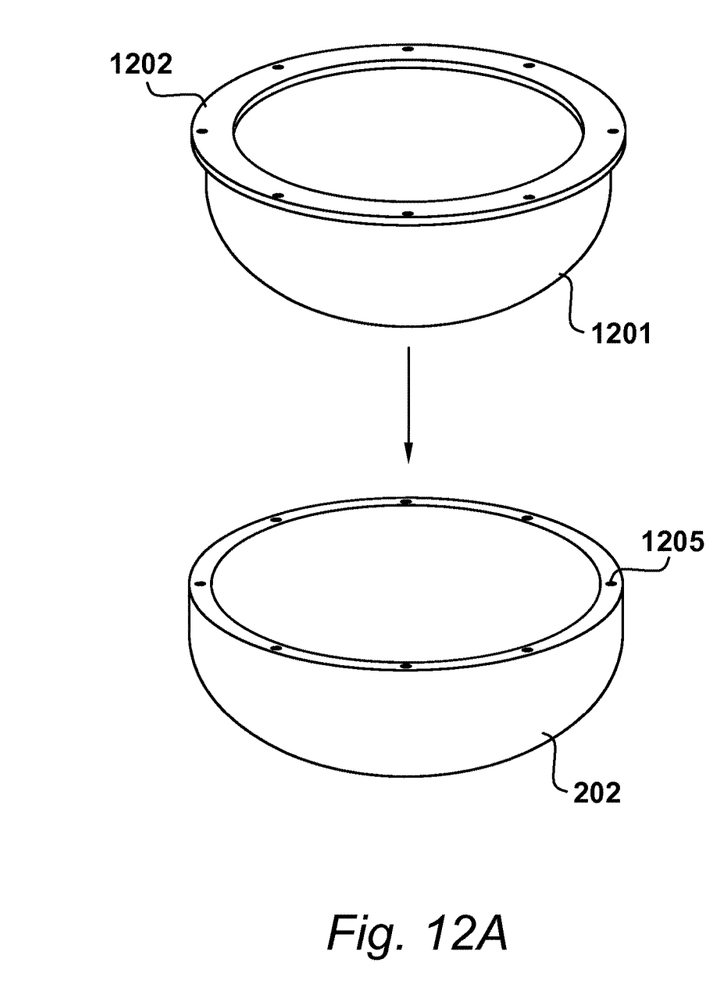
FIGS. 12A and 12B show a first lining for the outer shell of one of the heads of the pressure vessel of FIG. 1A.
Figure 12B:
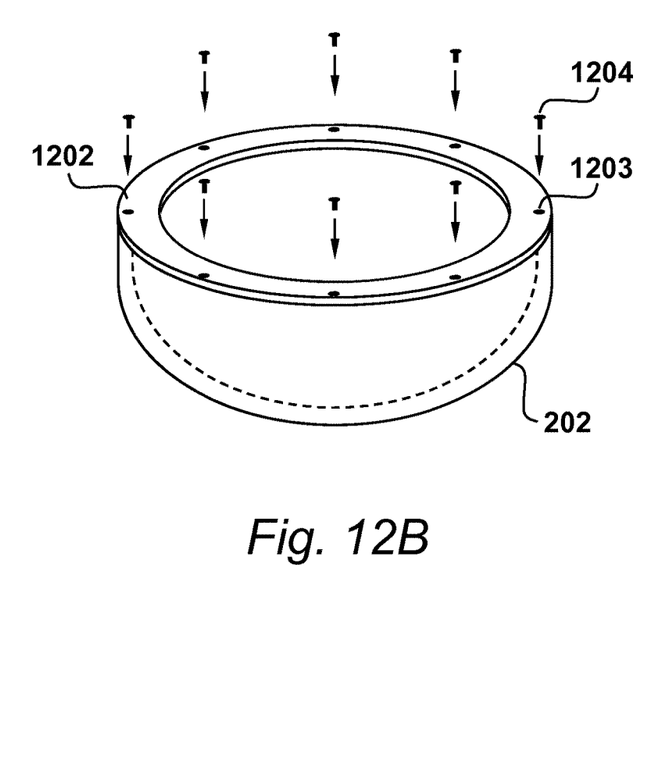

FIGS. 12A & 12B

A lining 1201 for forming the cladding 204 of the heads 103 and 104 is shown in FIG. 12A. In the present example, the lining 1201 is of substantially torospherical form to substantially conform to the interior geometry of the outer shell 202. As will be described with reference to FIGS. 14A and 14B, other lining configurations may be used. The lining 1201 may be manufactured by flow forming, shear forming, or hydroforming, or any other forming process or similar. Additive manufacturing could also be used if, for example, the geometric complexity justified it.

The lining 1201 is positioned in the interior of the outer shell 202. In the present example, the lining 1201 includes a radially outward flange 1202 comprising a plurality of circumferentially distributed apertures 1203. The flange 1202 locates and supports the lining 1201 relative to the outer shell 202, whilst the apertures 1202 permit bolts 1204 to pass through into threads 1205 in the rim of the outer shell 202.

Figure 13A:
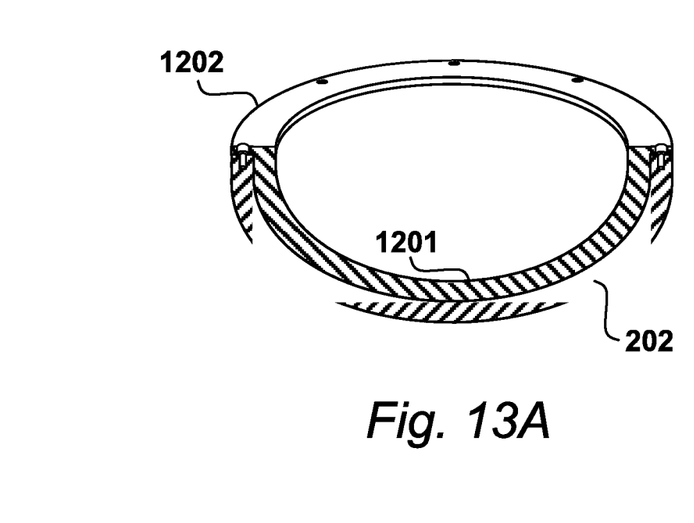
FIG. 13A shows the first lining placed in the outer shell of the head.
Figure 13B:
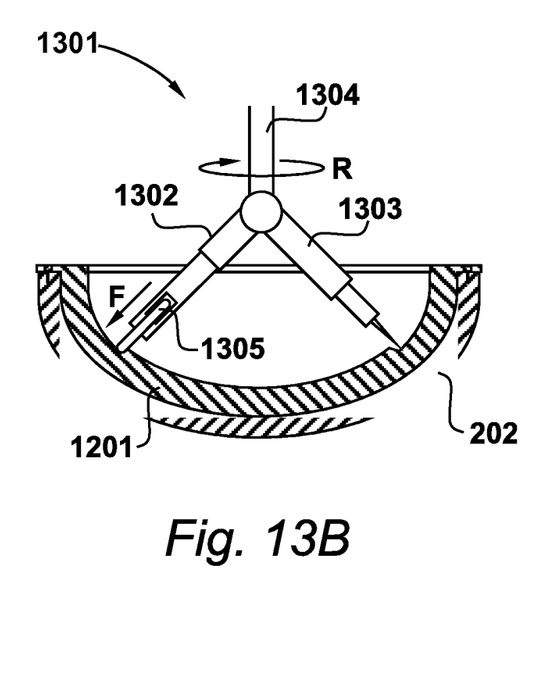
FIG. 13B shows apparatus for pressing and fusing the first lining to the outer shell of the head.

FIGS. 13A & 13B

A cut-away view of the outer shell 202 with the lining 1201 secured therein is shown in FIG. 13A. In this specific embodiment, the thickness of the lining 1201 is greater at the rim region than at its centre. Thus, when the lining 1201 is pressed progressively from the rim to the centre, any material creep will bolster the thickness in the centre, thereby giving an even thickness following pressing. In an example, the final thickness may be 6 millimetres. Other thicknesses may be selected, however, depending upon the intended use of the pressure vessel 101.

Referring to FIG. 13B, an apparatus 1301 for pressing and fusing the lining 1201 is shown, and comprises a pressing system 1302 and a fusing system 1303 pivotably mounted to a rotatable shaft 1304. The pressing system 1302 in this example comprises a single roller 1305. In an alternative example, two or more rollers may be used.

In operation, the shaft 1304 rotates, whilst the roller 1305 presses the lining 1201 into the outer shell 202 past its yield strength, pivoting such that the lining 1201 is initially pressed in the rim region and the process finished in its centre. The fusing system 1303, which like fusing system 1003 comprises a laser welding system in this example, also rotates to weld the pressed lining to the outer shell 202.

In an alternative embodiment, the pressing system 1302 and fusing system 1303 remain stationary and the outer shell 202 with lining 1201 are mounted in rotating chuck. Again, as with lining 401, the pressing and fusing processes may be carried out contemporaneously as illustrated in FIG. 13B, or, instead, separately, with the pressing system 1302 and fusing system 1303 not being mounted on the same shaft and instead being mounted on different booms or robotic arms, for example. Again, localised annealing may be performed following or between presses of the lining 1201 by, for example, a heat source (not shown) in the pressing system 1302. Alternatively, annealing of the whole lining could be performed in a separate process.

After fusing the lining 1201 to the outer shell 202, the bolts 1204 may be removed and a machining operation performed to remove the flange 1202.

Figure 14A:
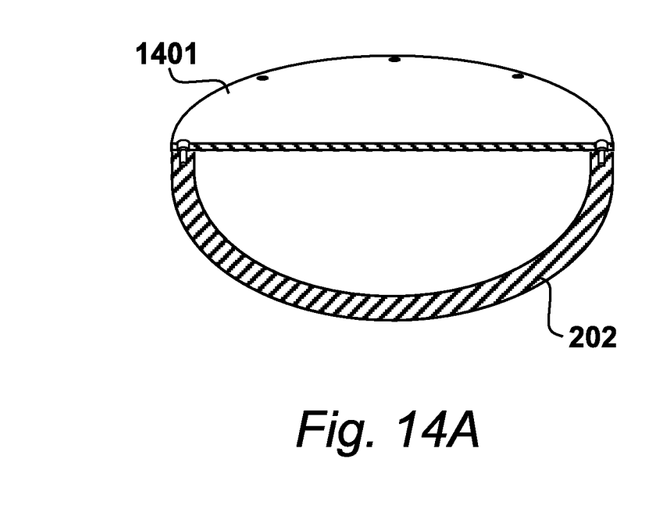
FIGS. 14A and 14B show, respectively, second and third heads for the outer shell of the head.
Figure 14B:
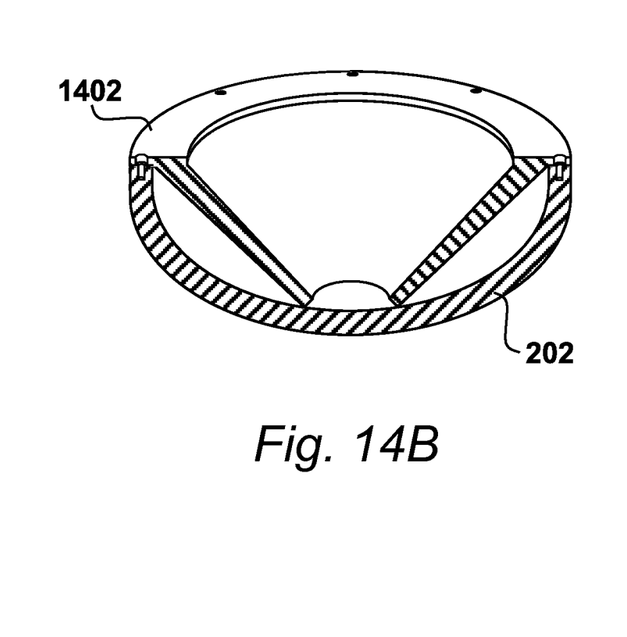

FIGS. 14A & 14B

A second lining 1401 which could be used for forming the cladding 204 of the heads 103 and 104 is shown in FIG. 14A. In this example, the lining 1401 is in the form of a disc, which is secured to the outer shell 202. The thickness of the disc shaped lining 1401, combined with its ductility, does mean that it may be worked into the shape of the interior of the outer shell 202. In an alternative embodiment, the lining 1401 may have a varying thickness with respect to radius, such that at its centre it is less thick than at its circumference. In this way, after the pressing process in which the lining will deform, there will be a constant thickness, possibly 6 millimetres or any other thickness, of lining pressed into the outer shell 202.

A third lining 1402 which could be used for forming the cladding 204 of the heads 103 and 104 is shown in FIG. 14B. In this example the lining 1402 is frustoconical. In the specific example illustrated in the Figure, the lining includes a taper from the rim region to its apex region. In this way, when pressed into the interior of the outer shell 202, the lining 1402 will deformed such that the hole is filled and there will be an even thickness of lining over the whole interior of the outer shell 202. As described previously, this thickness in an example may be selected to be 6 millimetres.

It will be appreciated that linings such as linings 1201, 1401 and 1402 may be suitably adapted for use with other head profiles such as hemispherical, ellipsoidal, or flat.

The invention claimed is:

1. A method of cladding an interior of a component of a pressure vessel, comprising:
    obtaining the component;
    obtaining a lining for the component which conforms to at least a portion of an interior geometry of the component;
    positioning the lining inside the interior of the component;
    pressing the lining into the component past a yield strength of the lining, in which the pressing of the lining comprises repeated iterations of pressing the lining and annealing the lining; and
    fusing the lining to the component.

2. The method of claim 1, in which a plurality of linings are obtained, positioned, pressed and fused to the interior of the component.

3. The method of claim 1, in which the component is one of:
    a cylindrical main body of the pressure vessel;
    a head of the pressure vessel; or
    a hemispherical half of the pressure vessel.

4. The method of claim 3, in which the component is the cylindrical main body of the pressure vessel, and the lining is one of:
    a hollow cylinder; or
    a hollow prism.

5. The method of claim 4, in which the lining is the hollow cylinder that is formed from one of:
    a seamless tube;
    a helical strip; or
    one or more arcuate extrusions.

6. The method of claim 3, in which the component is the head of the pressure vessel, and the lining is one of:
    flat;
    hemispherical;
    torispherical; or
    frustoconical.

7. The method of claim 1, in which the fusing of the lining to the component comprises welding the lining to the component.

8. The method of claim 1, in which the fusing of the lining to the component is performed by a laser welding process.

9. The method of claim 1, in which the lining is one of:
    stainless steel; or
    a nickel-base alloy.

* * * * *